No. 771,966. Patented October 11, 1904.

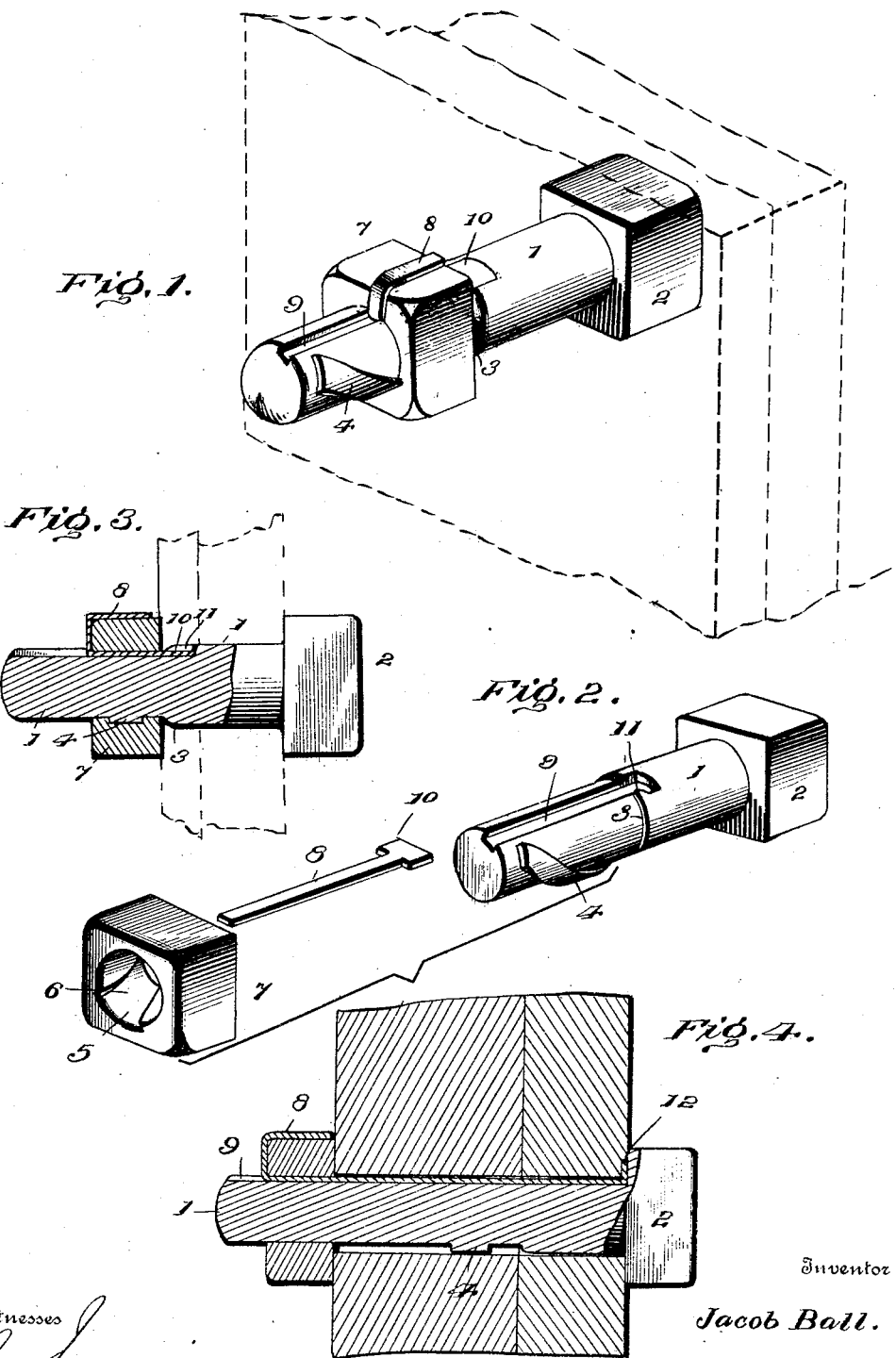

UNITED STATES PATENT OFFICE.

JACOB BALL, OF BARNESBORO, PENNSYLVANIA, ASSIGNOR OF ONE-THIRD TO WILLIAM OLDFIELD, OF BARNESBORO, PENNSYLVANIA.

NUT-LOCK.

SPECIFICATION forming part of Letters Patent No. 771,966, dated October 11, 1904.

Application filed May 4, 1904. Serial No. 206,391. (No model.)

*To all whom it may concern:*

Be it known that I, JACOB BALL, a citizen of the United States, residing at Barnesboro, in the county of Cambria and State of Pennsylvania, have invented certain new and useful Improvements in Nut-Locks, of which the following is a specification.

This invention relates to an improved construction of bolt and nut and peculiar locking means for preventing displacement of the nut from the bolt when the latter is in actual use.

An essential object of my invention is to do away with the necessity of providing threads upon the nut and bolt, these parts being formed complete in the single operation of casting the same.

The invention is particularly adapted for use in securing parts subjected to a great amount of vibration and jar, since the lock means which coöperates with the bolt and nut is designed to positively prevent displacement of the nut under the conditions of service above described.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view. Fig. 2 is a perspective view, parts separated. Fig. 3 is a longitudinal sectional view. Fig. 4 is a longitudinal sectional view embodying a modification.

Corresponding and like parts are referred to in the following description and indicated in all the views of the drawings by the same reference characters.

In the practical embodiment of my invention my bolt is of substantially the same form in general outline as are those now in common use, and the same consists of the shank 1, provided with the usual head 2. The head may be of any form, being square, as illustrated. The end of the shank 1 of the bolt opposite to that with which the head 2 is formed is somewhat reduced, as shown at 3, and this reduced portion 3 is provided longitudinally thereof with a spiral rib or tongue 4. The spiral rib or tongue is adapted to coöperate with a spiral groove 5, provided upon the inner peripheral portion of the opening 6 in the nut 7. In other words, in disposing the nut 7 upon the bolt in operative position this nut is forced upon the reduced portion 3 of the shank 1 by a rotary motion, and the groove 5 of the nut coöperates with the spiral rib or tongue 4 of the shank 1 to move the nut longitudinally of the said shank.

In the contemplation of my invention it is necessary to use some lock means for holding the nut upon the shank of the bolt, since under ordinary circumstances the spiral groove and tongue connection between the nut 7 and the shank 1 is not sufficient to prevent displacement of the element 7 aforesaid. The preferred lock means utilized consists of a longitudinal lock-pin 8, which is seated normally in a longitudinal groove 9, formed in the reduced portion 3 of the shank 1, and this lock-pin is secured to the shank and is adapted to coöperate with the nut by engaging the latter to prevent displacement thereof. In order that the groove 9 may be formed readily in the operation of casting the bolt and so that the said groove 9 will not interrupt the spiral rib or tongue 4, this groove extends longitudinally of the shank at a point between the terminals of the rib 4 aforesaid. To accomplish this, the rib 4 is so formed as not to entirely encircle the shank 1 in order that the pin 8 may be seated without engaging the rib whatever. The foregoing disposal of the groove 9 admits of a greater ease of casting the completed bolts and simplifies the structure thereof in a manner which will be readily apparent. The innermost end of the lock-pin 8 in the preferred structure of the device is transversely enlarged, as shown at 10, and the enlarged portion is seated in a transversely-widened portion 11 of the groove 9. The thickness of the enlarged portion 10 of the pin is not greater than that of the body of this element, and the depth of the widened portion 11 of the groove 9 is substantially the same as that of the major portion of the groove itself, so that no liability of weakening the bolt is incurred. The outer end of the lock-pin 8 is adapted to be turned angularly, so as to engage the outer face of the nut 7 to thereby positively lock the nut from displacement after the latter has been disposed upon the shank and forced hard against the parts which are to be secured together. The spiral rib and groove construction of the nut and bolt is of a nature adapted to cause the nut to bind hard against a part in securing same in an ascertained position, and this having been done the lock-pin, which has been previously placed within the groove 9, is adapted to hold the lock in the position above indicated. The lock-pin itself cannot be displaced, since the enlarged portion 10 thereof, being seated in the widened portion 11 of the groove 9, firmly holds the lock-pin in position and prevents longitudinal play or movement thereof. The groove 5 of the nut 7 extends from the outer face of the nut to the inner face of the nut directly, being of spiral formation. The nut also may be readily cast as a completed article.

In the modified form of the invention the groove 9 extends the entire length of the shank 1 of the bolt and the lock-pin 8 is adapted to be disposed within the groove 9 aforesaid, the inner end of said lock-pin, however, being located adjacent the head 2 of the bolt and provided with a lateral or angular extension 12, which engages the parts secured together by the bolt, so as to prevent displacement of the lock-pin. The extension 12, in other words, performs a function similar to that performed by the enlarged portion 10 of the lock-pin 8, as constructed in the preferred form of my invention.

My invention, as regards the bolt and nut structure, may be very cheaply manufactured, owing to the fact that it is not necessary to thread the shank 1 of the bolt or the opening in the nut 7 in the usual manner, this operation under ordinary circumstances being one which involves much time and expense.

Having thus described the invention, what is claimed as new is—

The combination of a bolt having its shank provided with a spiral rib or tongue which does not entirely encircle said shank, said shank being provided with a longitudinal groove located between the terminals of the spiral rib or tongue, a nut having a spiral groove for coöperation with the rib or tongue of the shank, and a lock-pin seated in the longitudinal groove of the shank and coöperating with the nut to prevent displacement thereof.

In testimony whereof I affix my signature in presence of two witnesses.

JACOB BALL. [L. S.]

Witnesses:
THOMAS JACKSON,
DAVID GRIFFITHS.